United States Patent [19]
Washizaki et al.

[11] Patent Number: 5,212,634
[45] Date of Patent: May 18, 1993

[54] METHOD OF AND APPARATUS FOR AUTOMATICALLY GENERATING APPLICATION PROGRAM

[75] Inventors: Tsuyoshi Washizaki; Yoshinori Akiyama; Etsuko Nakada; Takeo Ishii, all of Yokohama; Isao Nishiyama, Yamato, all of Japan

[73] Assignee: Hitachi, Ltd., Tokyo, Japan

[21] Appl. No.: 489,665

[22] Filed: Mar. 7, 1990

[30] Foreign Application Priority Data

Mar. 10, 1989 [JP] Japan .................................. 1-056456

[51] Int. Cl.$^5$ ........................ G06F 15/20; G06F 15/22
[52] U.S. Cl. ...................................... 364/400; 364/401
[58] Field of Search ............... 364/400, 401, 406, 408, 364/413.01, 424.1, 419; 395/725, 700, 650

[56] References Cited

U.S. PATENT DOCUMENTS

| | | | |
|---|---|---|---|
| 4,563,739 | 2/1986 | Gerpheide et al. | 364/403 |
| 4,703,423 | 10/1987 | Bado et al. | 364/400 |

Primary Examiner—Roy N. Envall, Jr.
Assistant Examiner—Khai Tran
Attorney, Agent, or Firm—Antonelli, Terry, Stout & Kraus

[57] ABSTRACT

A method of and apparatus for automatically generating a program such as a slip processing program are provided. Prepared is a definition file for defining the input specification and output specification of the program. In accordance with information of the definition file, a term table for input and output items of the program is formed. The term table is referred to check if each output item term is included therein which matches with an input item term. Upon detection of the matched item term, a posting process program for that item term is automatically described.

7 Claims, 6 Drawing Sheets

FIG.3
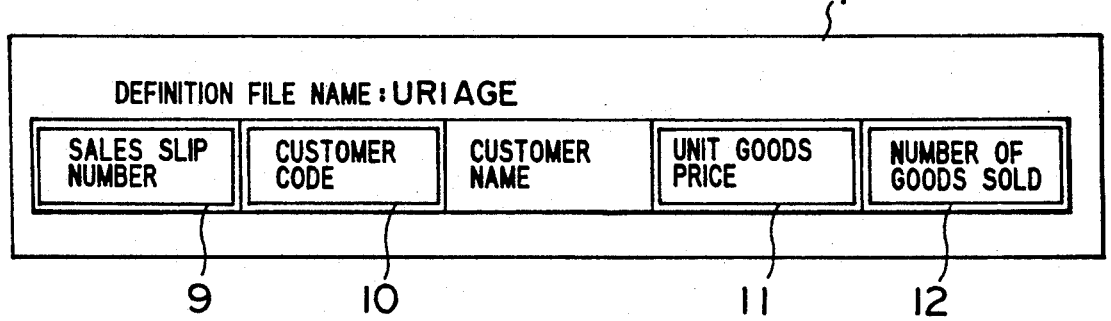
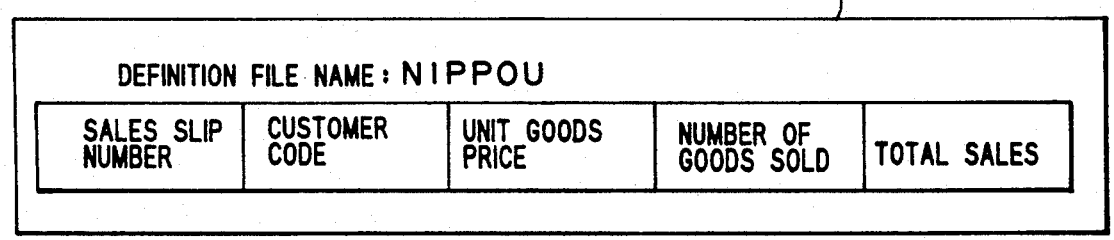
FIG.4
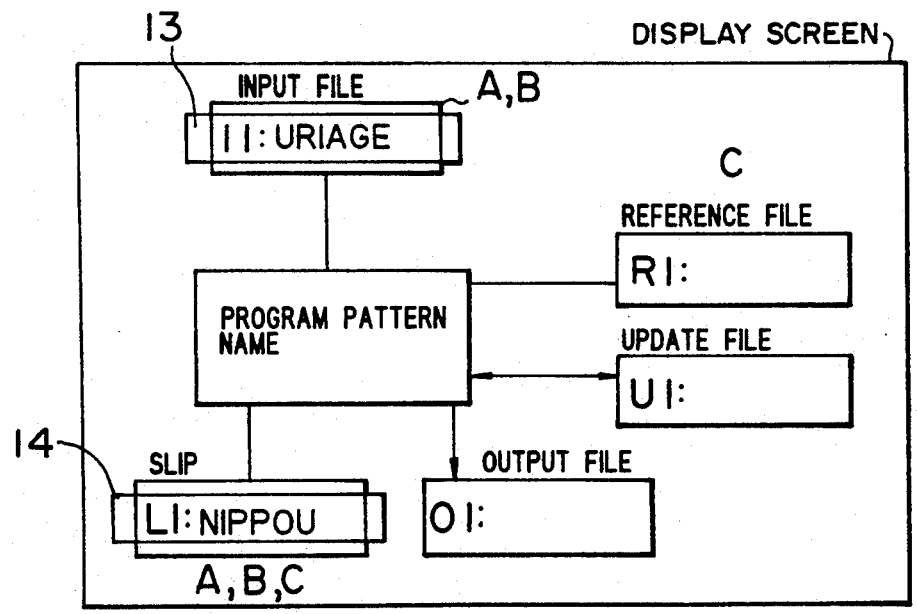

METHOD OF AND APPARATUS FOR AUTOMATICALLY GENERATING APPLICATION PROGRAM

BACKGROUND OF THE INVENTION

The present invention relates to a method of and apparatus for automatically generating programs, and more particularly to a method and apparatus suitable for improving productivity in generating various types of application programs.

In order to improve productivity in generating programs, there have been recently proposed various types of automatic generation of programs. For example, Japanese Patent Laid-open Publication JP-A-62-128335 has proposed economizing input work of program texts by patterning fixed or regular processes, while aiming at automatic coding and editing of patterned programs (languages). In generating an application program for business purposes for example, a daily sales report program, the relationship between inputs and outputs of a program to be developed is such that there occurs a need of posting input item information (data) into output items after the input items such as a sales slip number, a unit goods price, and the number of goods sold, have been entered or they have been edited. During developing such a program, identical terms have generally been used for both input and output items, and such an information posting process has been manually generated.

Generating a manual information posting process poses a problem of an increased amount of manual program description.

SUMMARY OF THE INVENTION

It is an object of the present invention to provide a method of and apparatus for automatically generating programs with improved productivity.

It is another object of the present invention to provide a method of and apparatus for automatically generating application programs such as a slip processing program, which is suitable for economizing labor of program coding and terminal input work such as in a posting process between identical items of an input/output specification.

In order to achieve the above objects, according to one aspect of the present invention, the program generating apparatus comprises a file for storing the definition of an input/output specification of an object program, table generating means for generating a term table for input and output item terms in accordance with the information of the defined input/output specification, check means for checking each output term in the term table with each input term therein and deriving an identical item term, and generating and outputting means responsive to an output from the check means for automatically generating a posting process program for the identical item term and outputting it.

In the program generating apparatus constructed as above, a term table for input and output terms is generated in accordance with an input specification file defining an input specification and an output specification file defining an output specification, and upon checking the item terms in the term table, an identical item term is derived to generate a posting process program which operates to post the input item information as the output item information. The posting process for the information with respect to the identical item term can be automatically generated.

BRIEF DESCRIPTION OF THE DRAWINGS

FIG. 3 is a diagram showing item terms in a definition file;

FIG. 4 is a diagram showing an interactive display screen used for the definition of an input/output specification;

DESCRIPTION OF THE PREFERRED EMBODIMENTS

An embodiment of this invention will be described in detail with reference to the accompanying drawings. The program generating apparatus embodying the present invention includes an input/output device, processor, memory and system controller, although they are not shown for the purpose of simplicity.

Figure 1:
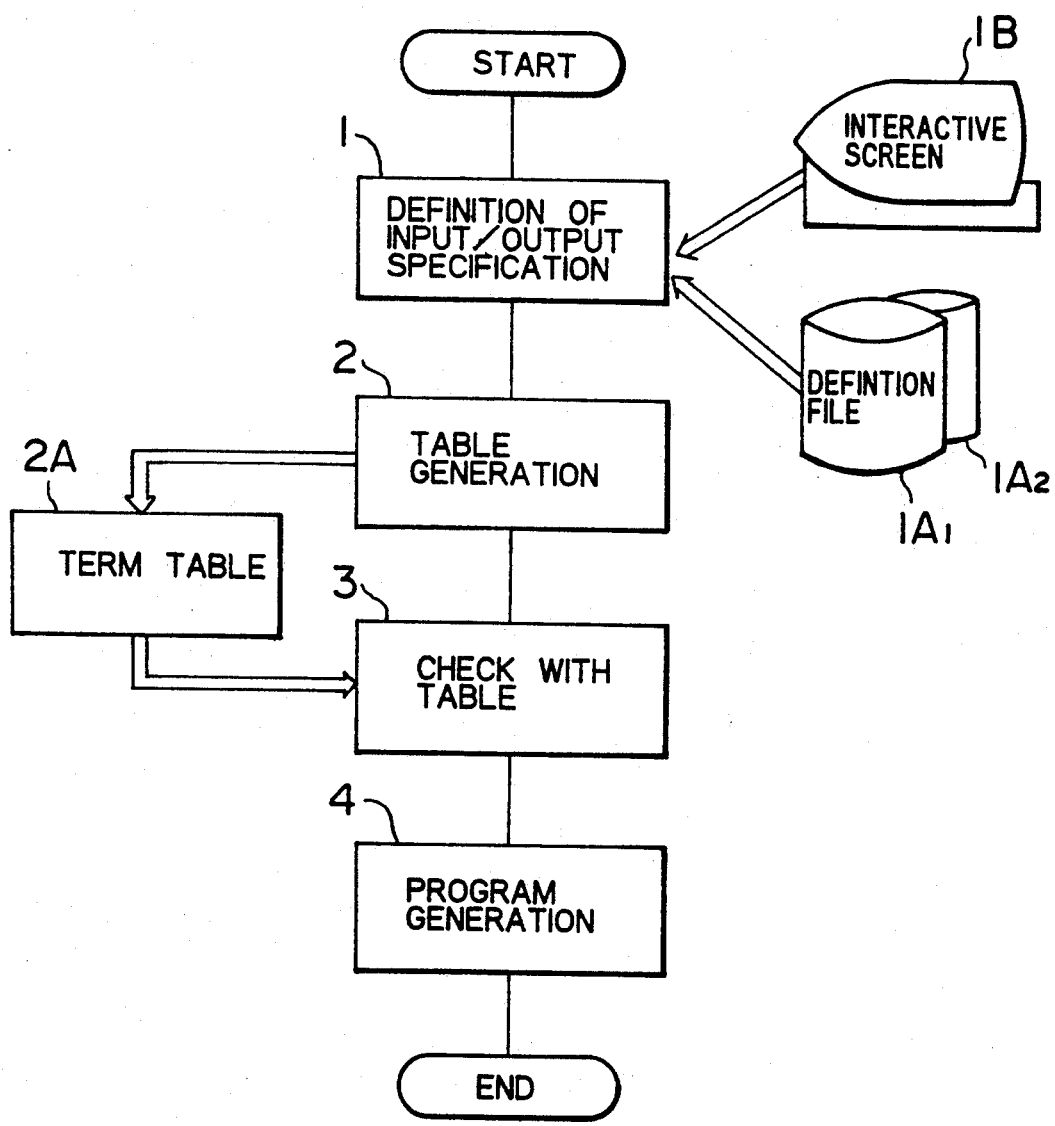
FIG. 1 shows a process flow illustrating an embodiment of this invention.

FIG. 1 shows a process flow for automatically generating a program according to an embodiment of this invention. The outline of the process flow will be described. First, one of definition files 1A (1A$_l$ to 1A$_n$) designated at an input/output specification definition process (step 1) is entered by operating upon a control station 1B equipped with an interactive display device and having a function of an input/output device. A term table 2A including input and output item terms is formed by a processor and stored in a memory (step 2). Next, the term table for input and output items is read to check each item term (step 3). Then, a posting process for the identical item term is automatically generated (step 4). With the above steps, the amount of manual description in generating a business purpose application program can be reduced. Such a program may be described in a language such as COBOL and PL-1.

Figure 2:
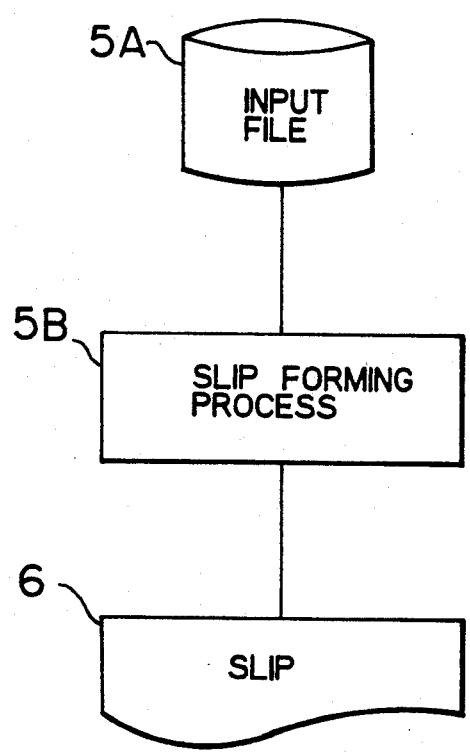
FIG. 2 illustrates an input/output specification of a slip generating program to be developed by using an embodiment of this invention.

FIG. 2 shows a general procedure for generating an input/output specification for a slip forming program to be developed upon application of this invention. The procedure includes reading from an input file 5A the information on item terms as the input specification, and forming a slip 6 as the output specification at a slip forming process 5B.

FIG. 3 shows the item terms in "URIAGE" (i.e. sales) 7 which is a definition file 1A (1A$_l$ to 1A$_n$) (FIG. 1) of the input file 5A (FIG. 2), and the item terms in "NIPPOU" (i.e. daily report) 8 which is a definition file 1A of the slip 6 (FIG. 2). URIAGE 7 as the definition file 1A of the input file 5A includes as input items a sales slip number 9, a customer code 10, a customer name, a unit goods price 11, and the number of goods sold 12. "NIPPOU" 8 as the definition file 1A of the slip 6 includes as output items a sales slip number, a customer code, a unit goods price, the number of goods sold, and total sales.

The objective program runs to output to the slip 6, the sales slip number 9, customer code 10, unit goods price 11, number of goods sold 12, and total sales obtained by multiplying the unit goods price 11 by the number of goods sold 12.

FIG. 4 shows an interactive display screen such as the display device 1B shown in FIG. 1 for use with the input/output specification definition. The display screen of FIG. 4 shows the condition that "URIAGE" and "NIPPOU" have been inputted to a program generating work memory (not shown), respectively as an input file I1 and an output slip L1. The display screen of FIG. 4 indicates that a reference file as a substitute for the input file and an updating file and output file as the substitutes for the input file and output slip have not been designated. Thus, the definition file 13 (indicated at 1A in FIG. 1) for "URIAGE" defined by the input file and the definition file 14 (indicated at 1A in FIG. 1) for "NIPPOU" designated by the output slip are entered to form the term table 2A shown in FIG. 5 by means of the processor (step 2 in FIG. 1).

Figure 5:
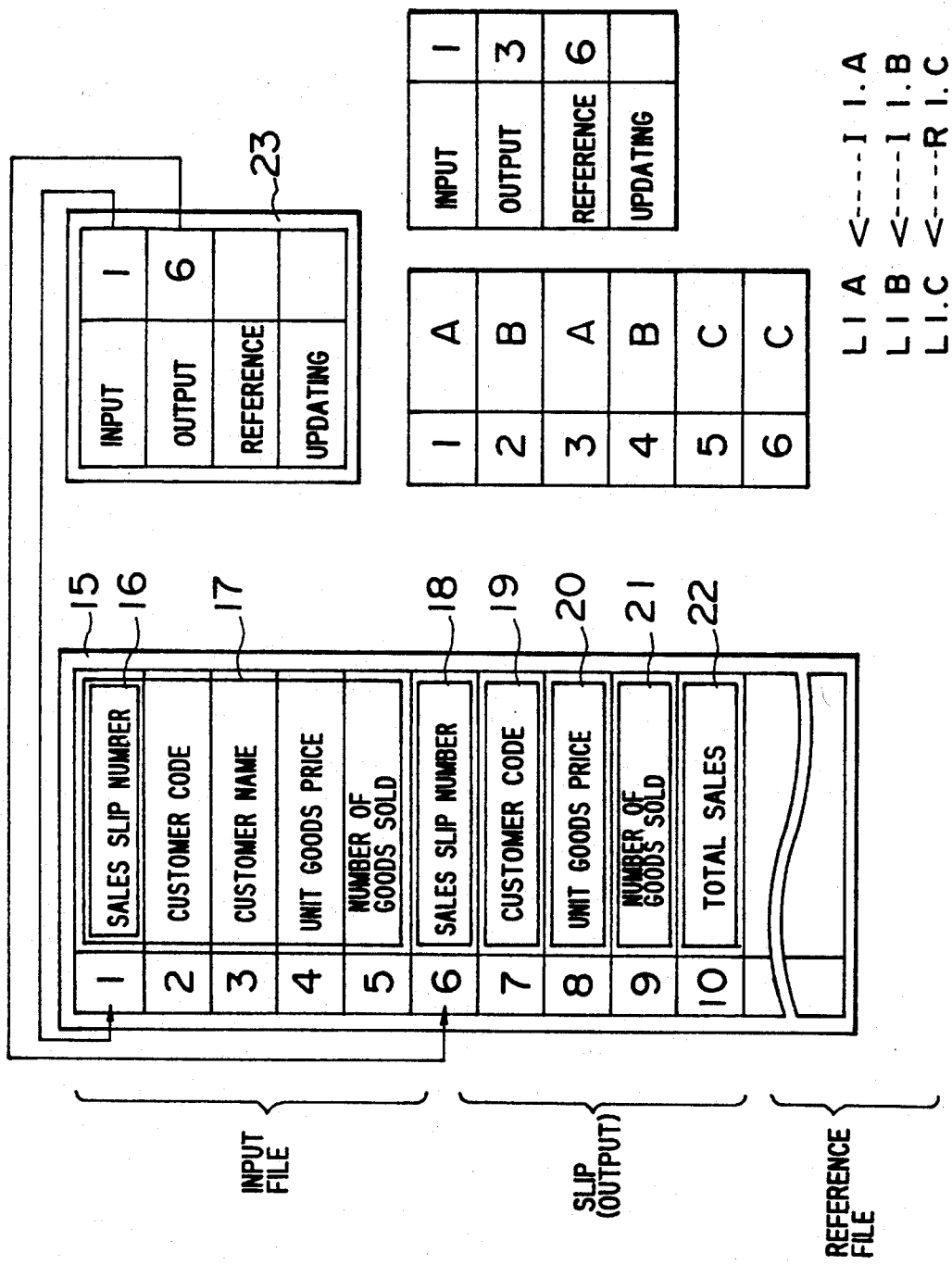
FIG. 5 is a diagram showing a term table.

FIG. 5 shows the generated term table 2A which includes a table 15 storing the terms of input and output items, and a pointer table 23 for identifying with a pointer whether each term corresponds to an input item or output item. The table 15 includes therein reference items and updating items (both not shown). Each item term in the table 15 may be added with an attribute data such as a character or numeral. The numerical attribute includes packed type and zone type attributes. In the pointer table 23 shown in FIG. 5, the input item points the first input item number 1, and the output item points the first output item number 6.

Figure 6:
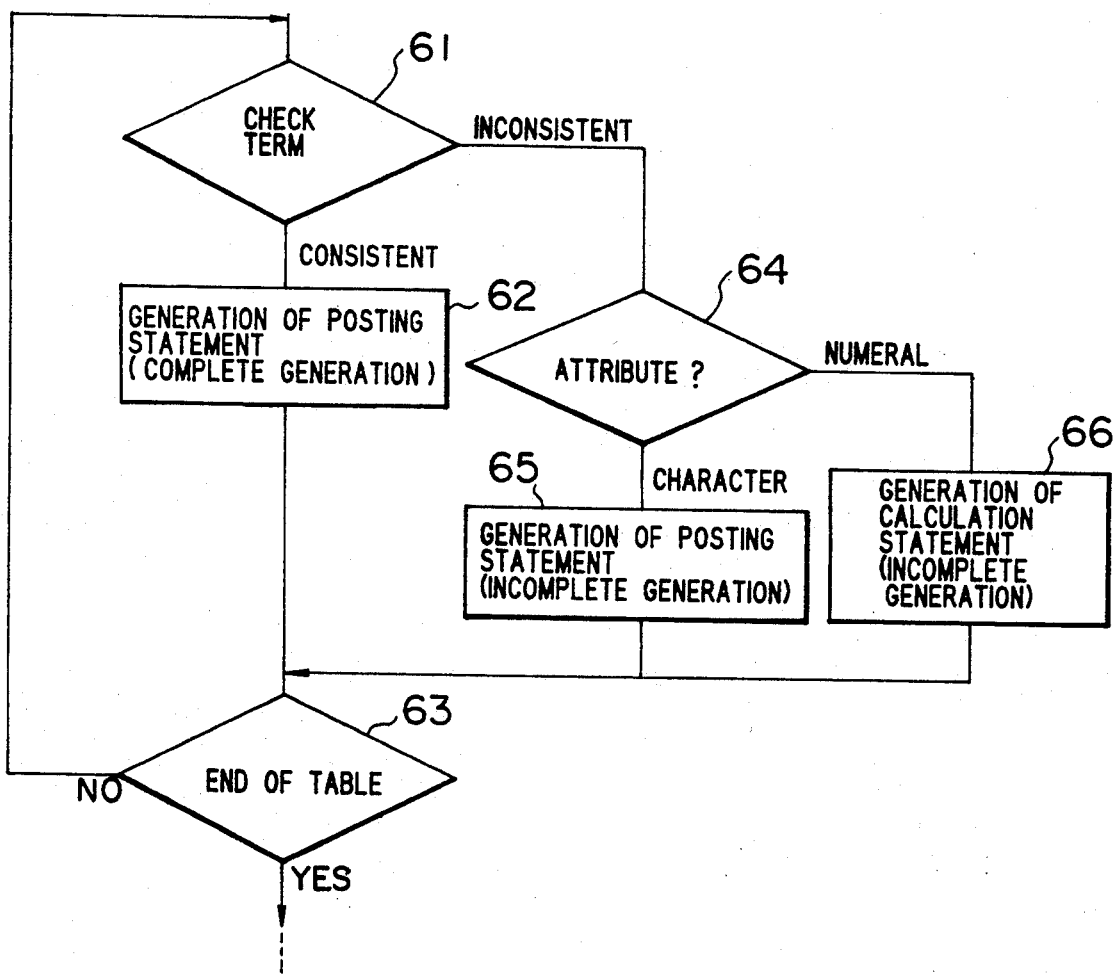
FIG. 6 is a flow chart of an illustrative process showing the detail of the main portion of the process flow shown in FIG. 1.

FIG. 6 is a process flow illustrating an example of the detail of the table check step and program description step 4 respectively shown in FIG. 1.

In the term check process, each term on the side of receiving such as a slip (output), updating file and output file, i.e., each term of the output specification, is checked with each item term in the input file. Upon a check failure, each item term in the reference file is checked. In the flow shown in FIG. 6, if the slip (output) for example is designated as the term on the receiving side L1, each term in the slip is checked while referring to the term table of the input file (step 61). Upon a check success or identical item term, a posting statement is generated. For example, a posting statement "post L1. customer name ≦-- I1. customer name" is generated (step 62). Thereafter, the term check is repeated until all the item terms in the term table at the output side have been completed (step 63).

If a check operation indicates an inconsistent result, the attribute of an input item term is checked (step 64). If the attribute is a character, a posting statement representative of incomplete program generation is written, and the flow advances to step 63 (step 65). If the attribute is a numeral, a calculation statement representative of incomplete program generation is written, and the flow advances to step 63 (step posting statement "post L1. customer name <-- ?" and a calculation statement "calculate L1. unit goods price <-- ?", respectively.

Figure 7:
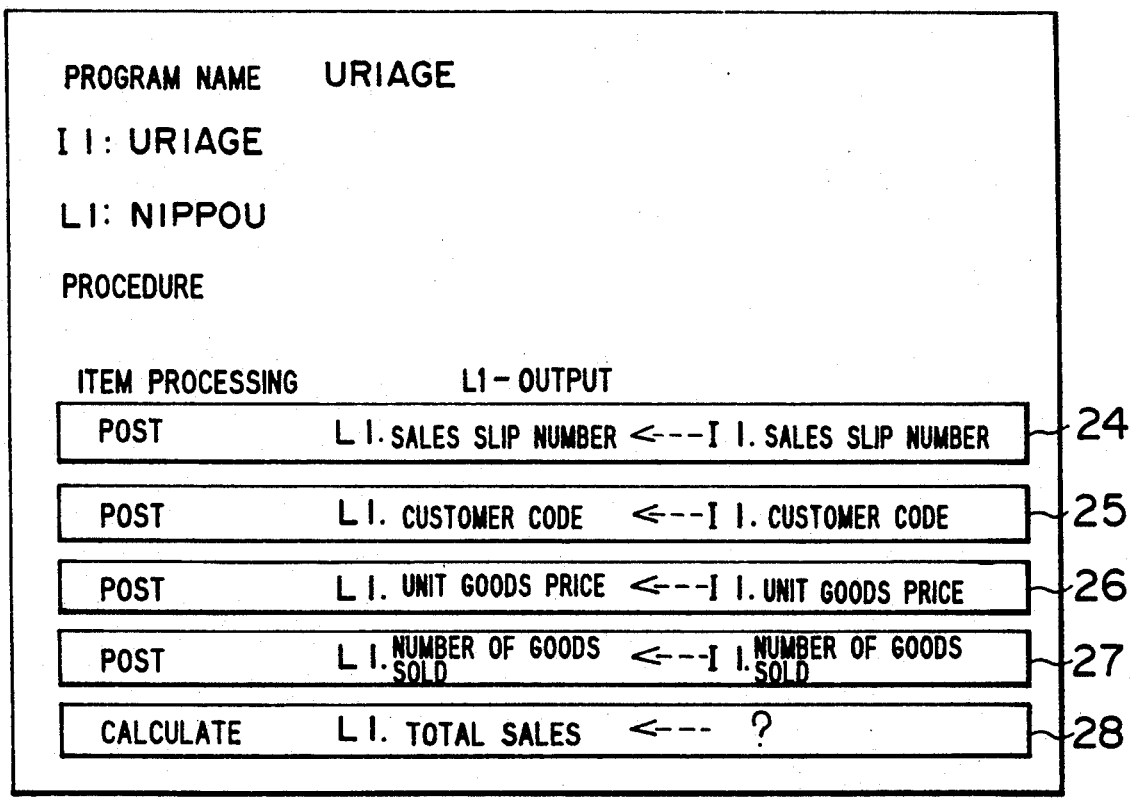
FIG. 7 shows a program generated by using an embodiment of this invention.

FIG. 7 shows an example of a program generated in accordance with input/output specification and the above-described processing. In FIG. 7, the first line enters a program name "URIAGE", and the second to fifth lines enter the definition file names of the input file and output slip defined and displayed on the display screen shown in FIG. 4. According to this embodiment, at step 3 in FIG. 1 each input item term in the term table is checked with each output item term therein. In dependence upon the check result at step 3, a program process is generated at step 4. A generated process 24 shown in FIG. 7 indicates a process of describing/instructing "post I1. sales slip number in L1. sales slip number". This process is generated because the output item term of sales slip number 18 is found consistent or matched with the input item term of sales slip number 16 at check step 3. The processes designated by reference numerals 25, 26 and 27 are generated because the output item terms 19, 20 and 21 are found consistent with the input item terms, respectively. In the process 28, the output item term of total sales 22 is not included in the table 17 so that a consistency is not obtained at check step 3 and a process character string (program description) is generated in the form of sending to the receiving side a symbol "?" indicative of incomplete program generation. It will be appreciated that manual description is needed only for the process having a symbol "?" indicative of no automatic generation. The process 28 is completed by manually and interactively entering "I1 unit goods price x I1. number of goods sold", whereas the processes 24 to 27 are automatically carried out to thus alleviate manual work.

As is apparent from FIG. 7, in editing character strings for automatic generation of respective processes or programs, each process character string is allocated to each line with the left most side characters being aligned on the same line.

What is claimed is:

1. An application program generating apparatus for generating an application program wherein said application program reads an input file and produces an output file based on input items contained in the input file, comprising:

an input/output specification file for defining a list of input terms representing said input items and a list of output terms representing output items to be produced on said output file;

table generating and storing means for generating a term table consisting of said input terms and output terms derived from said input/output specification file, and storing therein said term table;

check means coupled to said table generating and storing means for checking each output term in said term table with each input term therein and deriving identical item terms; and program describing means coupled to an output from said check means for generating said application program including a posting process for posting an input item to an output item with respect to each of said derived identical item terms.

2. An application program generating apparatus according to claim 1, wherein said check means includes means for indicating, if there is no output item term which is coincident with an input item term, an incomplete program generation for said output item term.

3. An application program generating apparatus according to claim 1, wherein said program describing means includes means for automatically generating at least a posting process program in the form of a character string in accordance with a result of said check by check means, said character string generating means having a function to edit character strings so as to line-feed a character string for each process program.

4. An application program generating apparatus according to claim 1, wherein said table generating and storing means stores in said term table in addition to said input and output items, reference items generated on the basis of a reference file constituting another input specification specification file, and updating items generated on the basis of an updating file constituting a substitute file for said input/output specification file.

5. A method of automatically generating an application program, wherein said application program reads an input file and produces an output file based on input items contained in the input file, comprising the steps of:
 (a) providing an input/output specification file for defining a list of input terms representing said input items and a list of output terms representing output items to be produced on said output file;
 (b) receiving information of said input/output specification file, generating a term table consisting of said input terms and output terms derived from said received information and storing said term table;
 (c) checking each input term in said term table with each output term therein and deriving identical item terms; and
 (d) automatically generating said application program including a posting process for posting an input item to an output item with respect to each of said derived identical item terms.

6. A method according to claim 5, further including a step of delivering an explicit indication of incomplete program generation for an output item term which is found inconsistent at said check step.

7. A method according to claim 5, wherein said step of automatically generating a process program in accordance with a check result of said check step includes a step of editing a character string for expressing said process program, said editing step line-feeding said character string for each program process to align the left most side of said character strings on the same line.

* * * * *